UNITED STATES PATENT OFFICE.

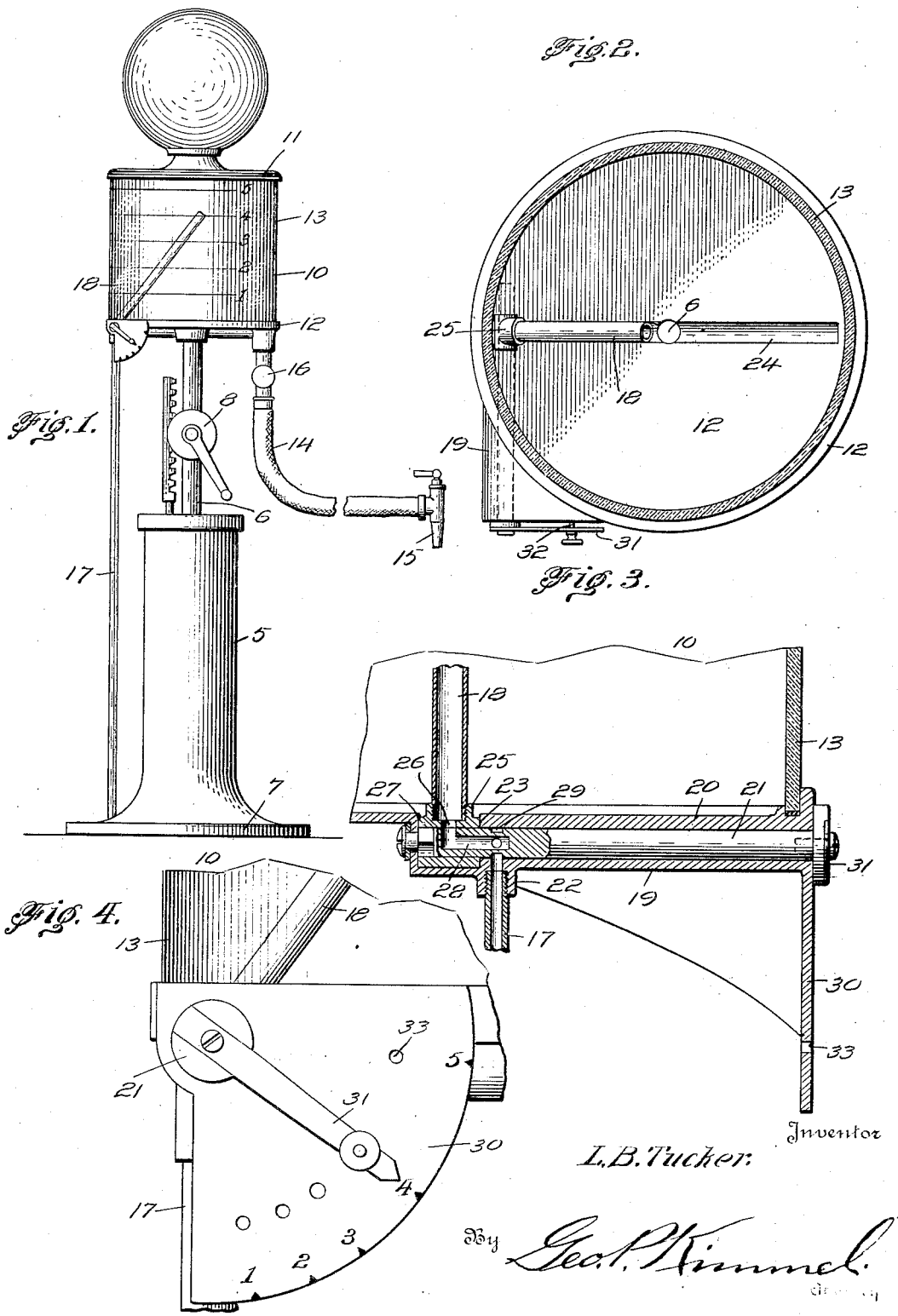

LOUISE B. TUCKER, OF YORK, PENNSYLVANIA.

MEASURING AND DISPENSING DEVICE.

1,395,168. Specification of Letters Patent. Patented Oct. 25, 1921.

Application filed June 10, 1920. Serial No. 387,837.

*To all whom it may concern:*

Be it known that I, LOUISE B. TUCKER, a citizen of the United States, residing at York, in the county of York and State of Pennsylvania, have invented certain new and useful Improvements in a Measuring and Dispensing Device, of which the following is a specification.

This invention relates to improvements in devices for affording visible means of dispensation of such liquids as gasolene by which the purchaser is enabled to correctly ascertain the exact amount of liquid delivered.

The principal object of the invention is the provision of a device of this character wherein a transparent receiver or container is equipped with an overflow pipe capable of accurate adjustment whereby the liquid deposited in the container above the level of the overflow pipe is carried off thereby, thereby insuring dispensation through the service pipe of the correct quantity of liquid, according to the adjustment of the overflow pipe.

A further object is the provision of a device of this character wherein means is provided for conveniently and accurately adjusting the overflow pipe.

With these and other objects in view, the invention consists in certain novel features of construction as hereinafter shown and described and then specifically pointed out in the claims, and in the drawings illustrative of the preferred embodiment of the invention.

In the accompanying drawings:

Figure 1 represents a front elevation of the invention applied to a conventional type of pump.

Fig. 2 represents a horizontal sectional view through the receiver looking downwardly upon the adjustable overflow pipe section, and Fig. 3 represents a detail view of the pivotal mounting for the adjustable overflow pipe.

Fig. 4 is a fragmentary detail of the device showing the indicator dial and the pointer associated therewith.

Referring to the drawing, wherein similar reference numerals designate corresponding parts throughout the several views, the numeral 5 indicates a conventional type of pump stand receiving a supply pipe 6 which connects with a body of liquid such as contained in a tank 7. A top 8 is connected with the supply pipe 6 and is designed to force a body of liquid therethrough and into the tank 9.

These parts are common to various types of liquid dispensing apparatus but the present invention resides in the equipment of the tank or receiver 10 with an adjustable overflow pipe by which the capacity of the receiver may be varied according to the amount of liquid to be dispensed therefrom.

The receiver consists essentially of top and bottom plates 11 and 12, respectively, and a circular transparent side wall 13 fitted between the plates 11 and 12 and secured therein by tie rods.

The main supply pipe 7 preferably communicates with the receiver 10 at the bottom central portion thereof and laterally of this connection the receiver is connected with a service pipe 14 having a suitable type of nozzle 15 at one end for convenience in directing the liquid into a receptacle to be filled. Adjacent the tank, or at any point along the pipe 14, a valve 16 is provided for cutting off the flow of liquid therethrough, when desired.

The liquid in the transparent receiver 10 is returned to the main tank 7 when the liquid level in the receiver attains a predetermined height by a return or overflow pipe consisting of relatively stationary and adjustable parts 17 and 18, respectively. The stationary pipe section 17 connects the bottom portion of the receiver 10 with the tank 7.

The bottom plate 12 of the receiver is provided with a boss 19 having a horizontal passage 20 therein receiving a shaft 21. The stationary part 17 of the overflow pipe communicates with the passage 20 by a short downwardly directed extension 22 thereof whereas the adjustable part 18 of the overflow pipe is mounted for swinging movement in a recess 23 formed in the bottom plate 12 and is keyed for rotation with the shaft 21. When the adjustable overflow pipe 18 is swung downwardly toward the bottom plate 12 it occupies a position within a diametrical depression 24 formed therein and in this position permits the entire contents of the receiver to return to the main tank 7 by gravity.

Connection between the adjustable overflow pipe 18 and shaft 21 is preferably established through a coupling 25 having a passage 26 connecting the interior of the pipe 18 with the aperture therethrough receiving the shaft 21 and at a point directly in line with the passage 26 the shaft 21 is formed with a circumferential groove 27 communicating by a port 28 extending diametrically and longitudinally of the shaft with a second circumferential groove 29 which latter is arranged directly in line with the discharge end of the overflow pipe section 17 thereby establishing permanent connection between the parts 17 and 18 of the overflow pipe.

A segmental dial or indicator plate 30 is arranged adjacent the forward end of the shaft 21 and is adapted to coöperate with an indicator hand 31 thereon to indicate the position of the inlet terminal of the adjustable overflow pipe 18, a nut 32 being fitted upon the rear extremity of the shaft 21 to maintain the parts in assembled relation.

In order that the purchaser may readily determine the quantity of the contents of the transparent receiver 10, the latter is preferably provided with graduated markings indicating gallons and desirable fractions thereof.

In operation, the attendant of the dispensing apparatus may be informed of the quantity of liquid desired by the purchaser, the indicator finger 31 is set at the proper position with relation to the markings of the plate 30 thus disposing the upper inlet terminal of the overflow pipe 18 in the horizontal plane of the graduation on the receiver 10 representing the quantity of liquid desired, whereupon the pump 8 is operated, subsequent to closure of the valve 16 until the liquid level in the receiver rises above the upper terminal of the adjustable overflow pipe 18. Operation of the pump is then discontinued and having permitted the liquid in the receiver in excess of that desired by the purchaser to return to the main supply tank 7 through the overflow pipe sections 17 and 18, the valve 16 is opened and permitting the contents thereof to flow through the pipe 14 into a suitable container (not shown). By first depositing the liquid to be dispensed in the transparent receiver 10, the purchaser is afforded ample opportunity of determining the exact amount of liquid dispensed and due to the adjustable mounting of the overflow pipe 18 the operator of the dispensing apparatus is capable of affording each customer the opportunity of actually seeing the amount of liquid dispensed, regardless of the amount purchased. When it is desired to return the entire contents, or any part thereof, to the main storing tank 7, the valve 16 is maintained in closed position and the adjustable overflow pipe 18 is swung into the depression 24 thereby permitting the liquid to return to the main supply tank through the overflow.

The finger 31 is preferably formed of spring material and is provided on its under side with a laterally projecting pin 32 selectively engageable in depressions 33 formed in the plate 30 and arranged according to the graduations thereon whereby the adjustable pipe section 18 is retained in adjusted position.

What I claim is:

1. In combination, a liquid container, a shaft journaled in the lower portion of the container having a ported extremity, an overflow pipe section communicating with the ported extremity of the shaft, an adjustable overflow pipe section communicating with and carried by the ported extremity of the shaft and arranged to swing in the container incident to turning movement of the shaft, and means independent of the overflow pipe for conducting liquid from the container.

2. In combination, a liquid container, a shaft journaled in the lower portion of the container having a port in one end, the opposite end of said shaft being extended exteriorly of the container, actuating means for the shaft carried by the extended terminal thereof, a relatively stationary overflow pipe section communicating with the port in said shaft and extending exteriorly of the container, an adjustable overflow pipe section communicating with the port in the shaft and mounted for adjustment with the latter within the container, and a liquid dispensing pipe independent of the overflow pipe sections, for conducting liquid from said container.

3. In combination, a container, a shaft journaled in the lower portion of the container having a port in one end communicating with the container, the opposite extremity of the shaft being extended externally of the container, actuating and indicating means associated with the extended terminal of the shaft, a relatively stationary overflow pipe section communicating with the port in said shaft, an adjustable overflow pipe section connected and communicating with the port in said shaft and arranged for vertical adjustment in the container, and a liquid dispensing pipe independent of the overflow pipe sections for conducting liquid from said pipe.

4. In combination, a container, a bearing provided at the lower portion of the container communicating at one end with the interior of the latter, a shaft journaled in said bearing having a port in the inner extremity thereof, a relatively stationary overflow pipe section communicating with the port in said shaft, a coupling member connected with the inner extremity of the shaft, and an adjustable overflow pipe section communicating with the coupling member and adjustable therewith incident to turning movement of the shaft.

5. In combination, a container, a bearing member carried by the lower portion of the container communicating at one end with the interior of the latter, a shaft journaled in said bearing member having a ported inner extremity communicating with the interior of the container, a relatively stationary overflow pipe section communicating with the port in said shaft and extending exteriorly of the container, a coupling member detachably connected with the inner extremity of the shaft, and an adjustable overflow pipe section connected with the coupling member for turning movement with the shaft.

6. In combination, a container, a bearing member carried by the lower portion of the container communicating at one end with the latter, a ported shaft journaled in said bearing member, a coupling member detachably connected with the inner extremity of the shaft, means removably securing the shaft in position in the bearing member, an adjustable overflow pipe section communicating with the port in the shaft and carried by the coupling member for turning movement with the shaft, the opposite extremity of the shaft being extended exteriorly of the casing, an indicator plate carried by the container, and an indicating hand carried by the shaft and movable over the indicator plate for indicating the elevation of the inlet terminal of the overflow pipe section.

7. In combination, a container, a shaft journaled in the lower portion of the container having a ported inner extremity, a relatively stationary overflow pipe section communicating with the port in the shaft, an adjustable overflow pipe section connected with the inner extremity of the shaft and mounted for swinging movement in the container, the opposite extremity of the shaft being extended exteriorly of the container, an indicating finger connected with the extremity of the shaft, and means carried by the finger for maintaining the shaft and adjustable overflow pipe section in adjusted position.

In testimony whereof, I affix my signature hereto.

LOUISE B. TUCKER.